US008823234B2

(12) United States Patent
Ortt et al.

(10) Patent No.: US 8,823,234 B2
(45) Date of Patent: Sep. 2, 2014

(54) MOTOR WITH PERMANENT MAGNETS HAVING ESSENTIALLY THE SAME INNER AND OUTER RADIUS; AND METHOD OF MANUFACTURING A MOTOR STATOR HOUSING WITH PERMANENT MAGNETS

(75) Inventors: Earl M. Ortt, Bel Air, MD (US); Hung T. Du, Reisterstown, MD (US); Sankarshan Murthy, Cockeysville, MD (US)

(73) Assignee: Black & Decker Inc., Newark, DE (US)

( * ) Notice: Subject to any disclaimer, the term of this patent is extended or adjusted under 35 U.S.C. 154(b) by 1378 days.

(21) Appl. No.: 12/443,191

(22) PCT Filed: Oct. 12, 2007

(86) PCT No.: PCT/US2007/021818
§ 371 (c)(1),
(2), (4) Date: Mar. 27, 2009

(87) PCT Pub. No.: WO2008/048492
PCT Pub. Date: Apr. 24, 2008

(65) Prior Publication Data
US 2010/0033036 A1    Feb. 11, 2010

Related U.S. Application Data

(60) Provisional application No. 60/851,814, filed on Oct. 13, 2006.

(51) Int. Cl.
*H02K 21/26* (2006.01)
*H02K 23/04* (2006.01)
*H02K 1/17* (2006.01)
*H02K 15/03* (2006.01)
*H02K 1/27* (2006.01)

(52) U.S. Cl.
CPC .............. *H02K 1/17* (2013.01); *H02K 23/04* (2013.01); *H02K 15/03* (2013.01); *H02K 1/2786* (2013.01)
USPC ............ 310/154.29; 310/154.01; 310/154.06; 310/154.21

(58) Field of Classification Search
CPC ........... H02K 1/17; H02K 1/27; H02K 23/04; H02K 23/40
USPC ............... 310/49.24, 49.28, 49.29, 49.35, 50, 310/154.01, 154.03, 154.04, 154.13, 310/154.16, 154.17, 154.29, 154.05, 310/154.06, 154.09, 154.11, 154.28, 310/154.43, 154.45; 29/597, 607, 609
See application file for complete search history.

(56) References Cited

U.S. PATENT DOCUMENTS

| 4,823,037 | A  | * | 4/1989  | Abukawa et al. ............ 310/230 |
| 4,973,872 | A  | * | 11/1990 | Dohogne ................ 310/156.28 |
| 5,238,130 | A  | * | 8/1993  | Marques et al. ............. 215/216 |
| 5,779,456 | A  | * | 7/1998  | Bowes et al. ................ 417/420 |
| 6,972,503 | B2 | * | 12/2005 | Hasumi ................... 310/156.43 |
| 2003/0011264 | A1 | * | 1/2003  | Du ........................... 310/156.08 |
| 2003/0178103 | A1 | * | 9/2003  | Harimoto et al. ............ 148/105 |
| 2004/0017119 | A1 | * | 1/2004  | Yamamoto et al. ......... 310/68 B |
| 2004/0113504 | A1 | * | 6/2004  | Agnes et al. ............ 310/154.08 |
| 2006/0255665 | A1 | * | 11/2006 | Kraus et al. .................... 310/36 |
| 2007/0075602 | A1 | * | 4/2007  | Nakano et al. .......... 310/154.21 |
| 2008/0122565 | A1 | * | 5/2008  | Komura et al. ............... 335/284 |

FOREIGN PATENT DOCUMENTS

| DE | 4205255 A1 | * | 8/1993 |
| EP | 1233497 A2 | * | 8/2002 |
| GB | 1354387 A  | * | 5/1974 |
| SU | 1271708 A1 | * | 12/1986 |
| WO | WO 2006068188 A1 | * | 6/2006 |

OTHER PUBLICATIONS

Machine Translation EP1233497 (2002).*
Machine Translation DE4205255 (1993).*

* cited by examiner

*Primary Examiner* — Tran Nguyen
*Assistant Examiner* — Jose Gonzalez Quinones
(74) *Attorney, Agent, or Firm* — Amir Rohani; Scott Markow

(57) ABSTRACT

An electric motor has a rotor and a stator. The rotor or the stator has arced permanent magnets that have essentially the same inner radius (IR) and outer radius (OR). In an aspect, the stator has a stator housing having a plurality of poles. Each pole includes a plurality of flat magnets affixed to an inner surface of the stator housing. In an aspect, flats on the outside of the stator housing key the stator assembly in a power tool housing. In an aspect, flat magnets are pre-magnetized, pre-assembled with alternating magnetic polarities, inserted into a stator housing, and remagnetized to a final, desired magnetic polarity configuration. In an aspect, pre-magnetized magnets and unmagnetized magnets are pre-assembled with unmagnetized magnets between magnetized magnets, the pre-assembled magnets inserted into a stator housing, and the unmagnetized magnets magnetized to a final, desired magnetic polarity configuration. In an aspect, pre-magnetized magnets are inserted between anchors inwardly extending from an inner surface of a stator housing with the anchors retaining each magnet placed in the stator housing between anchors from being angularly displaced by subsequently inserted magnets. In an aspect, pre-magnetized magnets are inserted in recesses in an inner surface of a stator housing with the recesses retaining each magnet placed in the stator housing between anchors from being angularly displaced by subsequently inserted magnets. In an aspect, each pole has at least three magnets, at least one of the magnets being thinner than the other magnets. In an aspect, the outer most magnets are made of magnetic material that is more resistant to demagnetization than at least one of the other magnets. In an aspect, the magnets of each pole are unevenly spaced over the pole In an aspect, a power tool includes such an electric motor.

2 Claims, 10 Drawing Sheets

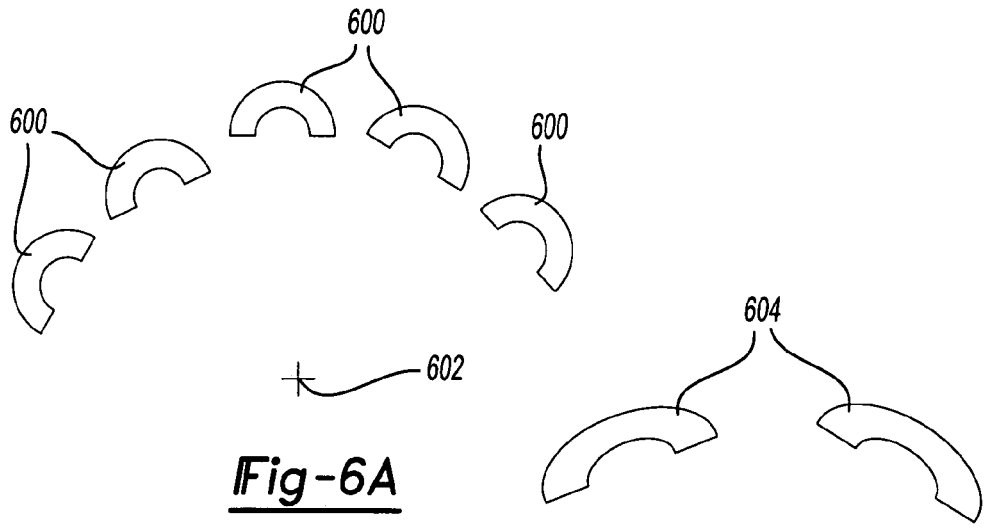
Fig-6A
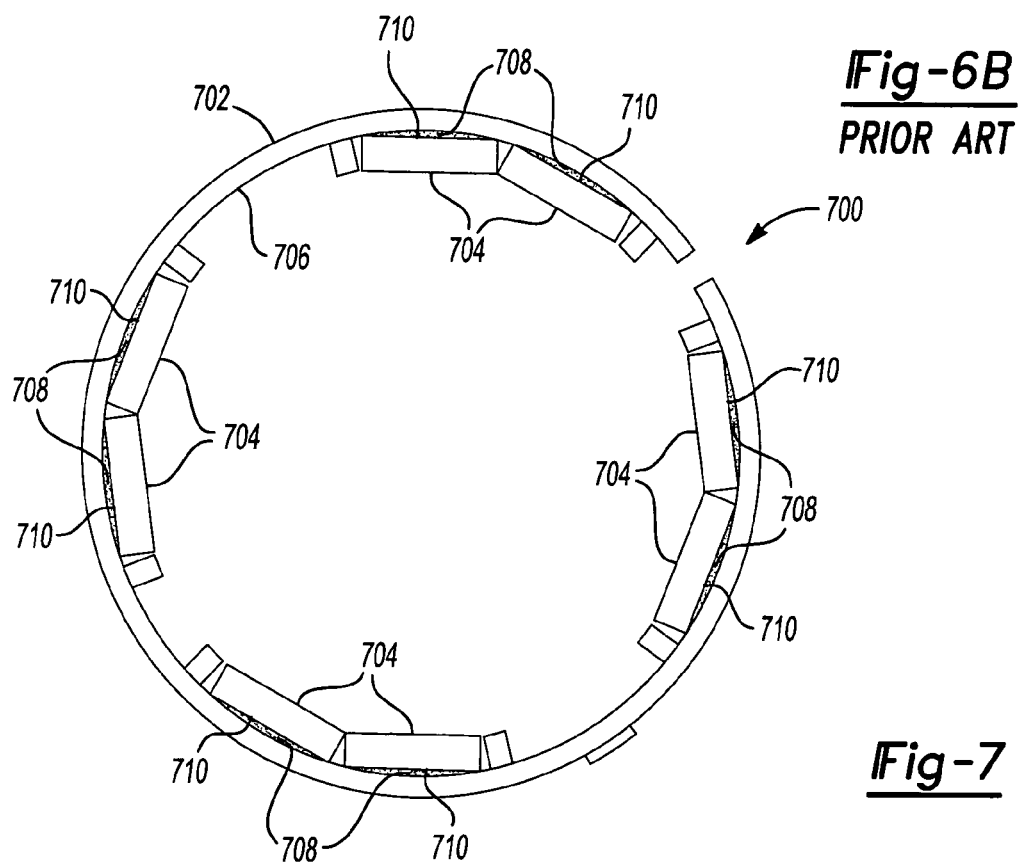
Fig-6B
PRIOR ART
Fig-7

MOTOR WITH PERMANENT MAGNETS HAVING ESSENTIALLY THE SAME INNER AND OUTER RADIUS; AND METHOD OF MANUFACTURING A MOTOR STATOR HOUSING WITH PERMANENT MAGNETS

CROSS-REFERENCE TO RELATED APPLICATIONS

This application claims the benefit of U.S. Provisional Application No. 60/851,814 filed on Oct. 13, 2006. The disclosure of the above application is incorporated herein by reference.

FIELD

The present disclosure relates to power tools and electric motors therefore including permanent magnet DC (PMDC) motors in which a stator has a stator housing assembly having a housing to which permanent magnets are affixed to an inner surface thereof. It also relates to electric motors having a rotor having permanent magnets.

BACKGROUND

In U.S. Pat. Nos. 6,522,042, 6,983,529 and 7,088,024, it is described that anchors for stator housings are formed in the housing or a flux ring, magnets are placed in the housing or flux ring such as between the anchors, and a plastic material is overmolded that fills around the anchors to secure the magnets to the flux ring or housing. The entire disclosures of U.S. Pat. Nos. 6,522,042, 7,088,024 and 6,983,529 are incorporated by reference herein.

In a known process, uniform thickness, sintered NdFeB magnets are made by a preliminary shaping process, followed by precise OR and IR grinding to obtain tight tolerances and a constant thickness across the arc of the magnet. Such preliminary shaping processes are hole sawing or wire EDM. This is typically done starting from solid blocks of magnet material. Another method is to press discrete magnets to their near-net shape.

SUMMARY

In accordance with an aspect of the present disclosure, either a rotor or a stator of an electric motor has arced permanent magnets that have essentially the same inner radius (IR) and outer radius (OR). In an aspect, a power tool includes such an electric motor.

In accordance with an aspect of the present disclosure, an electric motor has a stator having a stator housing having a plurality of poles. Each pole includes a plurality of flat magnets affixed to an inner surface of the stator housing. In an aspect, a power tool includes such an electric motor.

In an aspect, the inner surface of the stator housing is arcuate and the magnetic air gap at edges of the permanent magnets is greater than at the center of the permanent magnets.

In an aspect, the inner surface of the stator housing includes flats to which the permanent magnets are affixed. In an aspect, there is a flat for each permanent magnet. In an aspect, the thickness of the stator housing adjacent the edges of the permanent magnets is less than a thickness of the stator housing adjacent the centers of the permanent magnets. In an aspect, each pole has at least three permanent magnets and the thickness of the stator housing adjacent the outermost permanent magnets of each pole is greater than the thickness of the stator housing adjacent the center permanent magnet of each pole. In an aspect, the thickness of the stator housing adjacent the centers of the permanent magnets is greater than a thickness of a stator housing having the same outside diameter and an arcuate inner surface to which the permanent magnets are affixed.

In an aspect, there is at least one flat in the stator housing per pole.

In an aspect, an outer surface of the stator housing has flats corresponding to one or more flats of each pole on the inner surface of the housing. In an aspect, the flats on the outside of the stator housing key the stator assembly in a power tool housing.

In an aspect, flat magnets are pre-magnetized, pre-assembled with alternating magnetic polarities, inserted into a stator housing, and remagnetized to a final, desired magnetic polarity configuration.

In an aspect, pre-magnetized magnets and unmagnetized magnets are pre-assembled with unmagnetized magnets between magnetized magnets, the pre-assembled magnets inserted into a stator housing, and the unmagnetized magnets magnetized to a final, desired magnetic polarity configuration.

In an aspect, pre-magnetized magnets of each pole are inserted into a stator housing, outermost to inner most. In an aspect, the order is reversed.

In an aspect, pre-magnetized magnets are inserted between anchors inwardly extending from an inner surface of a stator housing with the anchors retaining each magnet placed in the stator housing between anchors from being angularly displaced by subsequently inserted magnets.

In an aspect, pre-magnetized magnets are inserted in recesses in an inner surface of a stator housing with the recesses retaining each magnet placed in the stator housing between anchors from being angularly displaced by subsequently inserted magnets. In an aspect, there is one recess for the magnets of each pole and the recess retains the outermost magnets of a pole from being outwardly angularly displaced by subsequently inserted inner magnets of the pole.

In an aspect, a stator assembly of an electric motor has a stator housing having a plurality of poles, each pole having at least three magnets, at least one of the magnets being thinner than the other magnets. In an aspect, a power tool includes such an electric motor.

In an aspect, a stator assembly of an electric motor has a stator housing having a plurality of poles, each pole having at least three magnets, the outer magnets made of a magnetic material that is more resistant to demagnetization than the magnetic material of which at least one of the other magnets is made. In an aspect, a power tool includes such an electric motor.

In an aspect, a stator assembly of an electric motor has a stator housing having a plurality of poles, each pole having at least three magnets, the magnets unevenly spaced over the pole. In an aspect, a power tool includes such an electric motor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIGS. 6A and 6B are schematics comparing a PMDC motor in accordance with an aspect of the present disclosure having a larger number of small magnet segments with a prior art PMDC motor having fewer, larger magnet segments;

FIG. 7 is an end view of a stator assembly for a PMDC motor having planar magnet segments attached to an arcuate inner surface of a stator housing with glue filling the gaps between radial outer surfaces of the magnet segments and the arcuate inner surface of the stator housing, in accordance with an aspect of the present disclosure;

DETAILED DESCRIPTION

Figure 19:
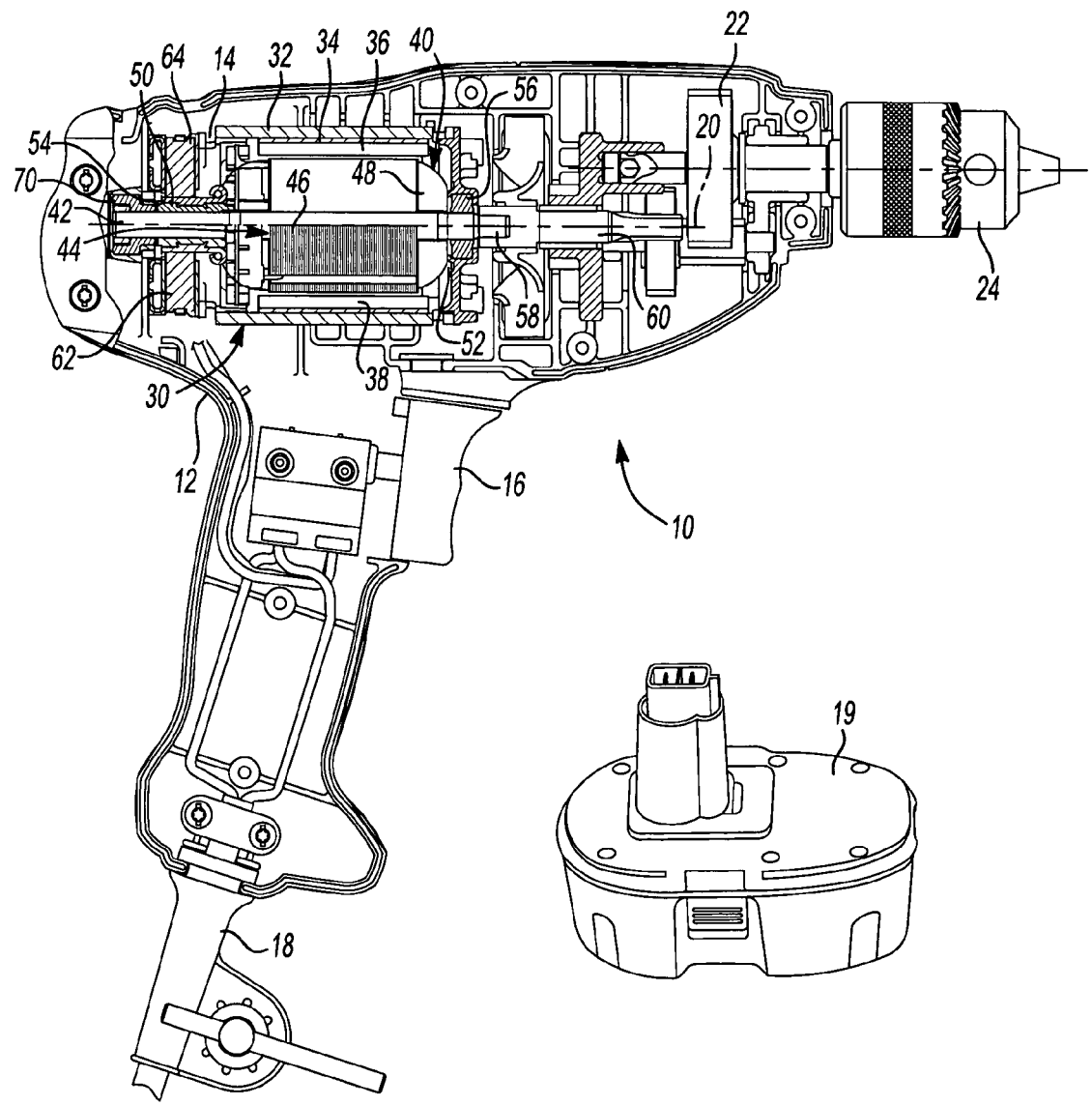
FIG. 19 is a side perspective view of a prior art power tool.

Referring now to FIG. 19, a prior art power tool 10 is shown. The power tool 10 includes a housing 12 which surrounds a motor 14. An activation member 16 is coupled with the motor and a power source 18. The power source 18 includes either a power cord (AC current) or includes a battery pack 19 (DC current). The motor 14 is coupled with an output member 20 that includes a transmission 22 and a chuck 24. The chuck 24 is operable to retain a tool (not shown).

The motor includes a stator assembly 30. The stator assembly 30 includes a stator housing 32, a flux ring 34 and magnets 36. The flux ring 34 is an expandable or split flux ring. An armature 40 includes a shaft 42, a rotor 44 and a commutator 50 coupled with the shaft 42. The rotor 44 includes laminations 46 and windings 48. The motor 14 also includes end plates 52 and 54. End plate 52 includes a front bearing 56 which supports one end of a shaft 42. The shaft 42 is coupled with a pinion 60 that is part of the output member 20. Brushes 62 and 64 are associated with the commutator 50. A rear bearing 70 is also coupled with the end plate 54 to balance rotation of the shaft 42.

While motor 14 is illustratively shown as a permanent magnet DC ("PMDC") motor in which magnets 36 are affixed to an inner surface of flux ring 34, it should be understood that motor 14 could be other types of motors that utilize permanent magnets, such as a brushless motor in which the rotor has permanent magnets and the stator has electronically commutated windings.

Figure 1:
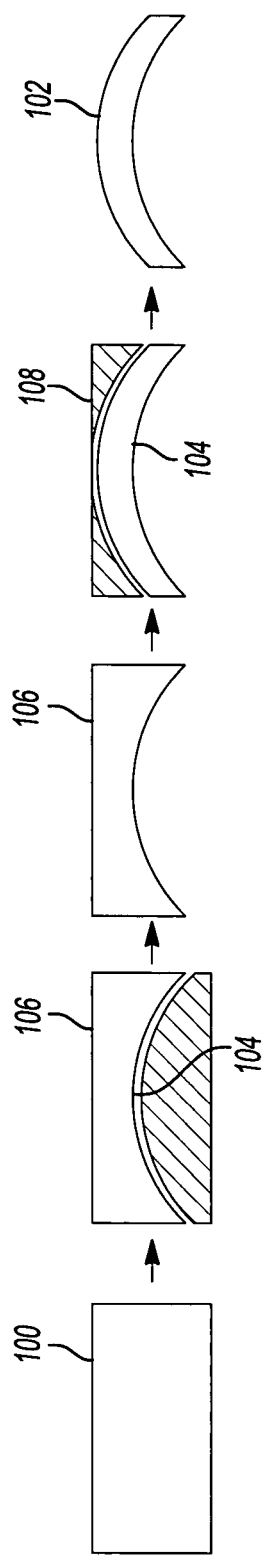
FIG. 1 is a schematic of a process for making arced magnets in accordance with an aspect of the present disclosure.

Referring to FIG. 1, a process for making arced magnets with the "same" OR and IR is described. The arced magnets are illustratively used in an electric motor of a power tool, such as in an electric motor used in lieu of motor 14 of power tool 10. In accordance with this process, the OR and IR of the arced magnets are essentially the same, with only a small offset as a result of the manufacturing process of hole sawing or EDM—the kerf of the EDM wire or hole saw results in the small difference after cutting. In such a process, the OR can be made to the desired size when the magnet is to be aligned or glued to the ID of a motor can, such as to the ID of a stator housing or flux ring in a permanent magnet DC motor for example. And the IR can be controlled to the desired dimension in the case where the magnet is attached to a rotor, such as to a rotor in a brushless motor for example. By designing the magnetic circuit appropriately (magnet thickness and magnetic air gap) the magnet grinding process can be eliminated, resulting in lower magnet production costs by reducing material scrap and elimination of the need for a grinding machine and operation. The tolerances produced by the hole sawing or EDM are sufficiently small and suitable for application in power tool motors. The main difference is that the magnet thickness is no longer constant over the arc of the magnet. It will be thicker at the center and thinner at the edges of the magnet. As long as the magnet circuit is designed to accommodate this, the motor performance objectives can be met. Additionally, this will have the added benefit of reduced cogging torques since the magnetic air gap is larger at the leading and trailing edges of the magnets.

For purposes of this application, magnetic air gap is the space between the surface of the laminations of the rotor or stator and the facing surface of the magnets of the other of the rotor or stator. For example, if the motor is PMDC motor where the stator has permanent magnets affixed to an inner surface of a stator housing and the rotor has magnetic wires wound in slots of a lamination stack on a shaft of the rotor, the magnetic air gap is the space between radially inner surfaces of the permanent magnets affixed to the inner surface of the stator housing and the outer surface of the lamination stack of the rotor.

The process in FIG. 1 proceeds left to right across FIG. 1. Starting with block of magnet material 100, the block 100 of magnet material is machined, such as by sawing or EDM, to form the IR 104 of an arcuate magnet segment 102. The magnet segment 102 may illustratively be used for a rotor of an electric motor. It may also be used for a stator of an electric motor. When the magnet segment 102 is used for a rotor, the IR is illustratively cut slightly smaller than the OR of the rotor back iron to provide for a glue gap.

After the IR is machined, the processed magnet block identified with reference number 106, is then machined to form the OR 108 of magnet segment 102 so that the OR is essentially the same as the IR.

In accordance with another aspect of the present disclosure, magnets, illustratively NdFeB magnets, are made by cutting blocks of magnetic material, such as blocks of NdFeB, into flat, planar segments. Such segments are commonly used in interior permanent magnet (IPM) brushless motor rotors. However they can also be used in brushed permanent magnet DC (PMDC) motors if designed appropriately.

Figure 2:
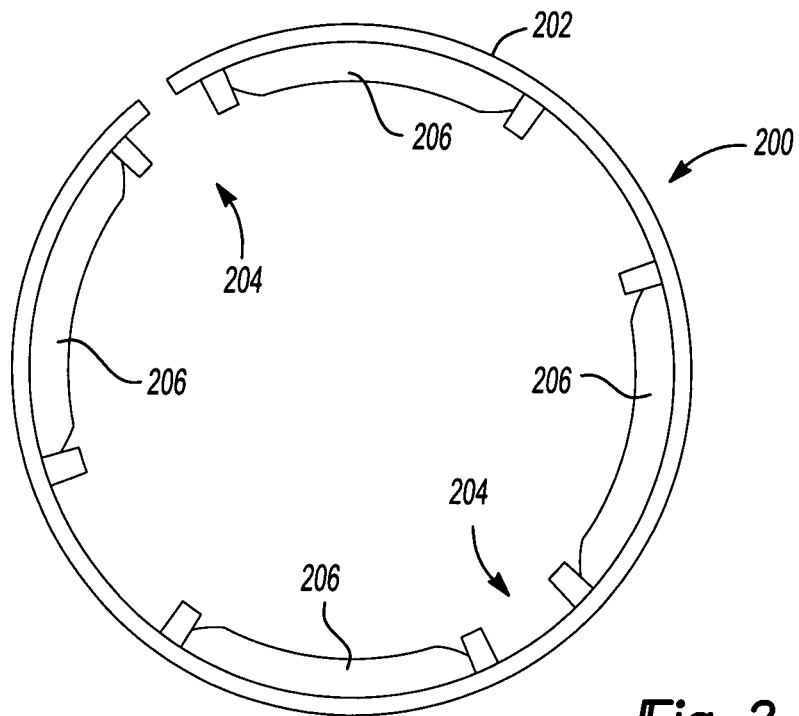
FIG. 2 is a prior art stator assembly for a PMDC motor having 4 NdFeB arced magnets with 2 magnets forming the north pole and two magnets forming the south pole.

FIG. 2 shows a prior art stator assembly 200 having a stator housing 202 (it being understood that a flux ring could also be used) for a PMDC motor having conventional two magnet arcs 204, 204, each comprising a North or South pole. In PMDC motors presently made by Black & Decker Inc., four NdFeB arcuate magnets 206 are used with two magnets 206 forming the North pole and two magnets forming the South pole.

Figure 20:
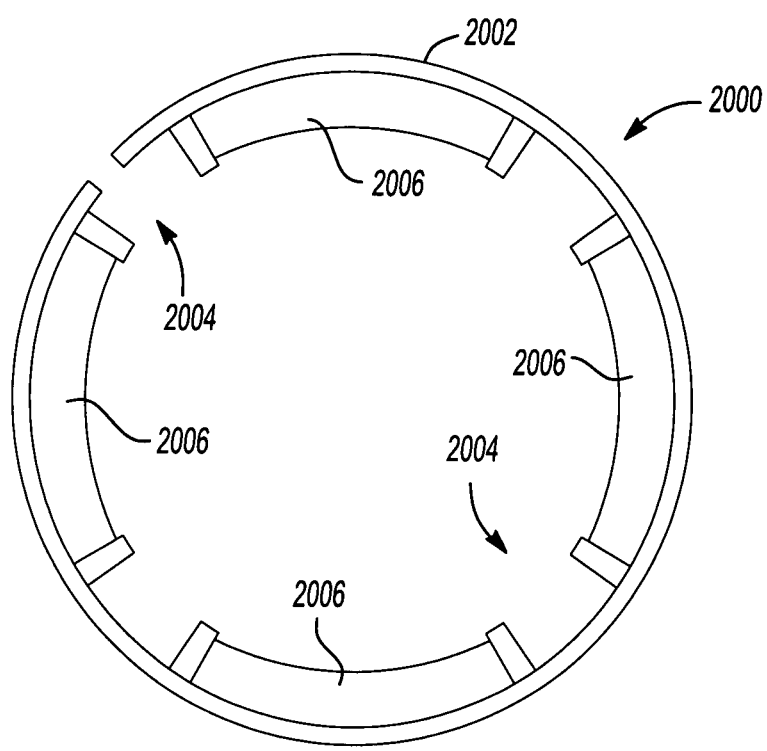
FIG. 20 is a stator assembly for a PMDC motor having 4 arced magnets having the same IR and OR with 2 magnets forming the North pole and two magnets forming the South pole.

FIG. 20 shows a stator assembly 2000 in accordance with an aspect of the present disclosure having a stator housing 2002 (it being understood that a flux ring could also be used) for a PMDC motor having two magnet arcs 2004, each comprising a North or South pole. Illustratively, two magnets 2006 form each of the North and South poles. In this aspect, the magnets 2006 have essentially the same IR and OR. In this regard, magnets 2006 may illustratively be made in accordance with the process described with respect to FIG. 1.

Figure 3:
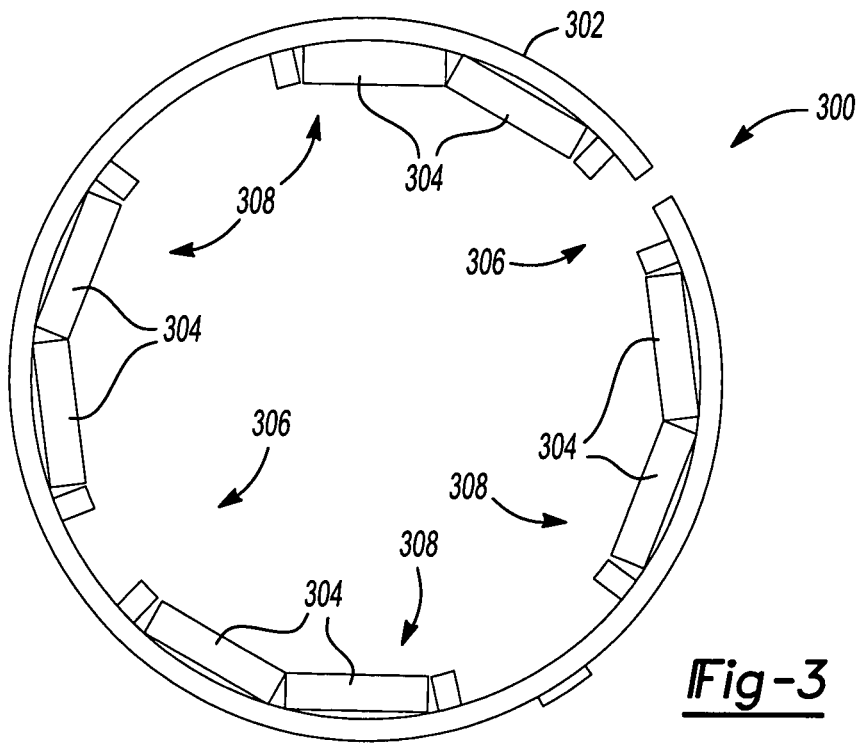
FIG. 3 is an end view of a stator assembly for a PMDC motor having 2 planar magnet segments in accordance with an aspect of the present disclosure.

In accordance with an aspect of the present disclosure, for flat magnets, it may be possible to still use two flat magnets per pole (or pole half where two sets of magnets form each pole), or it may be more advantageous to use three or more flat magnets per pole (or partial pole) to make the mechanical geometry as well as the magnetic circuit design of the magnet can assembly more practical. FIG. 3 is an end view showing a stator assembly 300 in accordance with an aspect of the present disclosure for a PMDC motor having a stator housing 302 with two segments 308 per pole 306. Each segment 308 has two flat magnets 304. In FIG. 3, the magnetic air gap at the ends of each flat magnet 304 is greater than at the center of each flat magnet 304.

Figure 4:
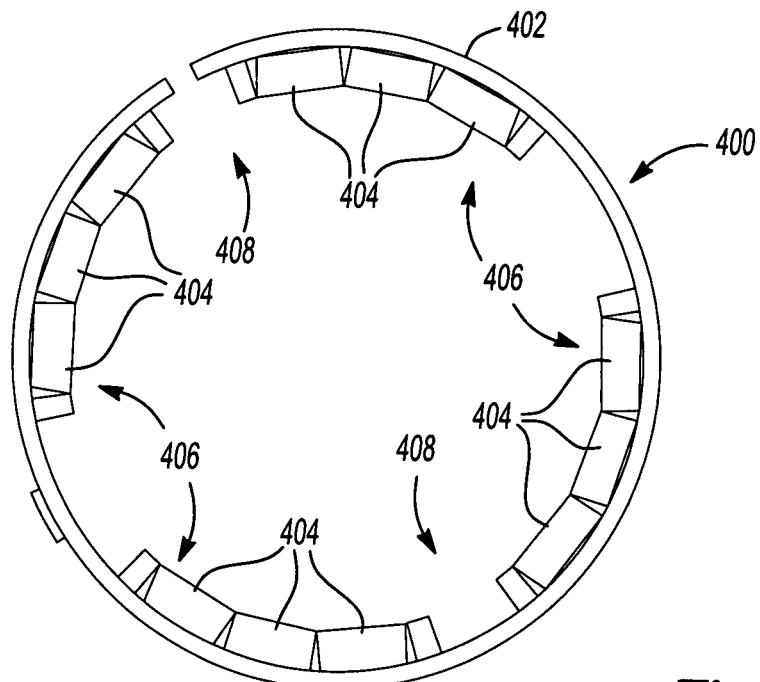
FIG. 4 is an end view of a stator assembly for a PMDC motor having 3 planar magnet segments in accordance with an aspect of the present disclosure.

FIG. 4 is an end view showing a stator assembly 400 in accordance with an aspect of the present disclosure for a PMDC having a stator housing 402 with 3 flat magnets 404 per partial pole 406. Each pole 408 in the embodiment shown in FIG. 4 has two partial poles 406. It should be understood that each pole 408 could be formed by three or more sets of two or more flat magnets 404. It should also be understood that the PMDC motor could have a plurality of north and south poles 408.

In an aspect of the present disclosure, saws are used to slice the larger blocks of magnet material into the thinner, flat magnets for use in the motor. Again, this eliminates the grinding process and also has a faster processing time compared to hole sawing and EDM used for arced magnets as described. Thus, the flat magnets would be even cheaper to produce.

It should be noted that the flat magnets could be used in conjunction with the anchoring system currently being used with overmolded stator assemblies, such as described in the above referenced U.S. Pat. Nos. 6,522,042, 7,088,024 and 6,983,529. In this case, it may be more advantageous to use 3 flat magnets since doing so would allow the plastic overmolding wall thickness to be reduced compared to using 2 flat magnets, as well as minimize the changes to the magnetic air gap and magnet.

Figure 5:
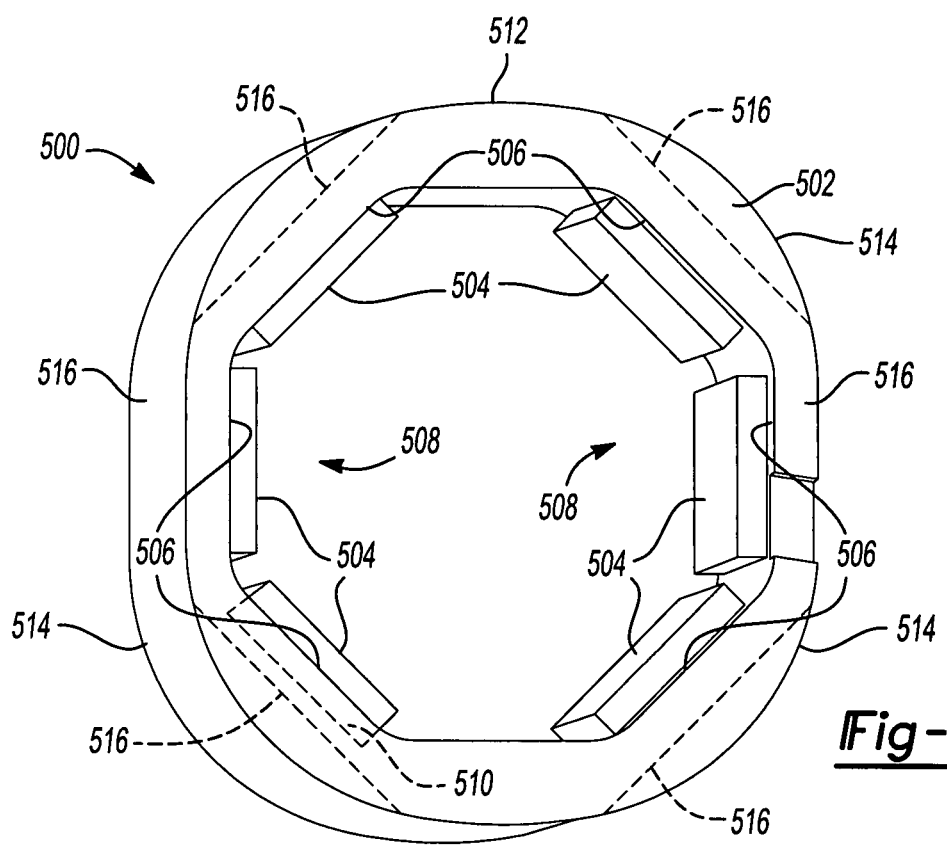
FIG. 5 is a perspective view of a stator assembly for a PMDC motor having flat magnets affixed to flat sections of a stator housing.

Additionally flat magnets can be used in a glued stator assembly with the flat magnet(s) glued to a mating planar or arcuate portion(s) of a stator housing or motor can (or flux ring). FIG. 5 is a perspective view of a stator assembly 500 for a PMDC motor in accordance with an aspect of the present disclosure having a stator housing 502. Stator housing 502 has flat magnets 504 attached to flat sections 506 (which may also be referred to as flats) of the stator housing 502. Stator assembly 500 illustratively has two poles 508 (one North pole and one South pole). In this aspect, the magnetic air gap is larger at the edges of the magnet, so it can be expected to reduce the cogging torque of the motor, though the magnetic circuit needs designed appropriately to meet the motor performance requirements. In an aspect, the magnetic air gap is illustratively at least twenty-five percent (25%) greater at the edges of the magnet than at the center of the magnet. In an aspect, the magnetic air gap is illustratively at least fifty percent (50%) greater at the edges of the magnet than at the center of the magnet.

FIG. 7 is a perspective view of a stator assembly 700 for a PMDC motor in accordance with an aspect of the present disclosure having a stator housing 702. Stator housing 702 has flat magnets 704 attached to an arcuate inner surface 706 of a stator housing 702 with glue 708 filling the gap between a radially outer surface 710 of the flat magnet 704 and the arcuate inner surface 706 of the stator housing 702.

In assembling the flat magnets to the stator housing, it is possible to use glue, or it is possible to use a double sided adhesive tape/foam that is sufficiently thin so that the magnet is not significantly spaced away from the stator housing back iron. Further, it may be possible to position the flat magnets within flat pockets on the inside of the stator housing (one such flat pocket 510 is shown in phantom in FIG. 5), thus eliminating the need for expensive and hard to maintain glue fixtures.

In the aspect shown in FIG. 5 where flat magnets 504 are attached to flat sections 506 of the stator housing 502, the thickness of the stator housing 502 (and thus the amount of steel), particularly at the center of the flat magnets 504, is greater than in the aspect of FIG. 7 where the stator housing 702 has an arcuate inner surface 702 and the flat magnets 704 are attached to the arcuate inner surface 702. And in particular, this is the case where, such as for an aspect of FIG. 5, an outer surface 512 of the stator housing 502 is arcuate (in whole or in part) and does not have flats corresponding to all or some of the flat sections 506 (which may be disposed in an arcuate inner surface of stator housing 502). In the embodiment of FIG. 5, outer surface 512 of stator housing 502 is arcuate at 514 adjacent the outer two flat magnets 504 of each set of three flat magnets 504 and flat at 516 adjacent the center flat magnet 504 of each set of three flat magnets 504. This increased amount of steel increases the flux path which increases the flux density of the magnetic circuit through the armature. This reduces flux leakage which decrease the magnetic attraction of foreign objects to the housing. It should be understood, however, that in an aspect outer surface 512 of stator housing 502 can have flats corresponding to each flat section 506, the additional flats shown in phantom at 516 in FIG. 5.

In making the stator housing for 2-pole, 4-pole, or higher pole count motors, it may be possible to make it by stamping and rolling, or by cold drawing the stator housing the drawn-over-mandrel (DOM) process. The DOM is followed by sawing the tubing to length and finishing the ends of the stator housing as required, if required. If the stator housing is made by the DOM process, the stator housing may also have the design features of the outer surface of the stator housing being round with the inside surface being a combination of round and flat spots where the flat magnets are to be placed. Thus, the wall thickness of the stator housing is not uniform, and must be designed accordingly for the required magnetic circuit.

The outer surface wall of the stator housing can have flats, such as flats 516 shown in FIG. 5 corresponding to the flat sections (such as flat sections 506 shown in FIG. 5) on the inner surface of the stator housing for magnet placement. These flats on the outside of the stator housing can further be used to accurately locate the stator assembly within the motor pack or power tool housing (two alternate methods of forming a power tool motor). This is required for correct angular positioning of the magnets relative to the motor brushes. In the case of a non-motor pack design, the flats on the outside of the stator housing may be used to key out the stator assembly within the power tool. Ideally this is done visibly, i.e., not a blind assembly process.

The thickness of the stator housing could be thinner over the pole centers to reduce the weight of the steel used in the stator housing, also as shown in FIG. 5. Again, this steel may be removed with minimal effect on the magnetic circuit, and must be designed accordingly to meet the motor performance requirements.

In the case of a stamped stator housing, it could be possible to coin the thickness of the metal prior to rolling the stator housing resulting in similar thinner wall stator housings.

Finally, the stator housing may be made by laminations, magnetic powder metal/insulated powder metal, or metal injection molding.

The foregoing aspects of the disclosure provide a number of advantages, which include: simplified & thus lower cost magnet production, and reduced cogging torque in the motor; making it possible to adhere the flat magnets to the stator housing double sided adhesive, eliminating need for fixtures and a difficult to control process; making it possible to use multiple flat magnet segments to replace a single arc segment; and the stator housing may contain features to locate the stator assembly within a power tool or motor pack.

In accordance with another aspect of the present disclosure, a larger number of smaller discrete, anisotropic magnets (arcuate or flat in shape) provide for a more radial magnet field than having two discrete, anisotropic magnets per pole. For example, having 5 small, sintered anisotropic NdFeB magnets 600 to form each pole will have 5 directions of linearly oriented magnetization pointing to the ID center point 602 of the stator housing (not shown in FIG. 6A). This is compared to two directions of linearly oriented magnetization pointing to the ID center point of the stator housing when two magnets 604 are used to form each pole, as shown in FIG. 6B. Radial magnetization means that the magnetic field through the magnet is pointing radially towards the center point of the ID of the stator housing. However in making sintered NdFeB magnets the magnet is linearly oriented during the manufacturing process, and thus magnetically anisotropic. Thus when magnetized in the motor, the linear bias remains and the magnetic field direction remains linear in the stator housing. By using more, smaller magnets, such as 5, the field becomes more radial as shown in FIG. 6A, as compared to using fewer, larger segments, such as 2, as shown in FIG. 6B.

Figure 8:
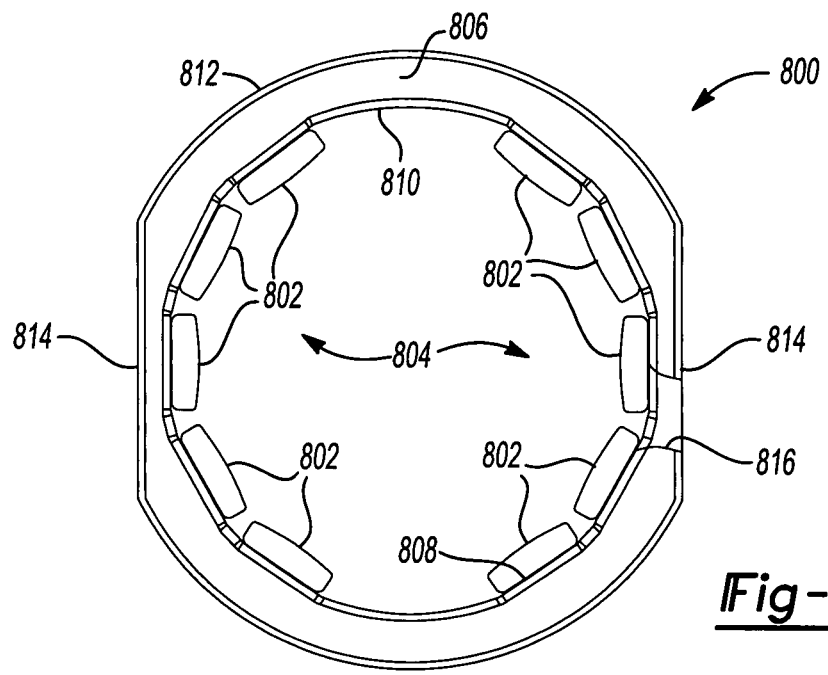
FIG. 8 is perspective view of a stator assembly for a PMDC motor having five planar magnets per pole attached to flat sections of a stator housing.

FIG. 8 shows an aspect in which a stator assembly 800 for a PMDC motor has five smaller flat magnets 802 for each of the poles 804 (north and south poles). Stator housing 806 illustratively has flats 808 (only one of which is identified in FIG. 8 with the reference number 808) in its inner surface 810 to which the flat magnets 802 are mounted. Outer surface 812 of the stator housing 806 illustratively is arcuate except for two opposed flats 814 centrally located over the center flat magnet 802 of the flat magnets 802 for the poles 804. These two opposed flats 814 extend across the respective center flat magnet 802 of the respective pole 804 and partially across each of the two flat magnets 802 adjacent opposed sides of each center flat magnet 802. As such, the thickness of the stator housing 806 is thinner adjacent the center flat magnets 802 of each pole 804 and thicker adjacent the outer flat magnets 802 of each pole 804. This provides the increased flux density at the outer flat magnets 802 where it is most needed and yet allows for reduction in the thickness of steel (saving both weight and material) at the center flat magnets 802 where having such increased flux density is less important.

In an aspect, the flat magnets are illustratively overmolded with an overmolding to secure them in place in the stator housing (not shown in FIG. 8), such as the overmolding discussed in U.S. Pat. Nos. 6,983,529 and 7,088,024. The stator housing 806 may illustratively include a notch 816 that, in cooperation with the flats 814 in the outer surface 812 of the stator housing 806, prevent the stator housing 806 from rotating in the power tool housing, such as disclosed in the application titled "Anchoring System for a Stator Housing Assembly Having an Overmolding" filed concurrently herewith, the entire disclosure of which is incorporated herein by reference.

Figure 9:
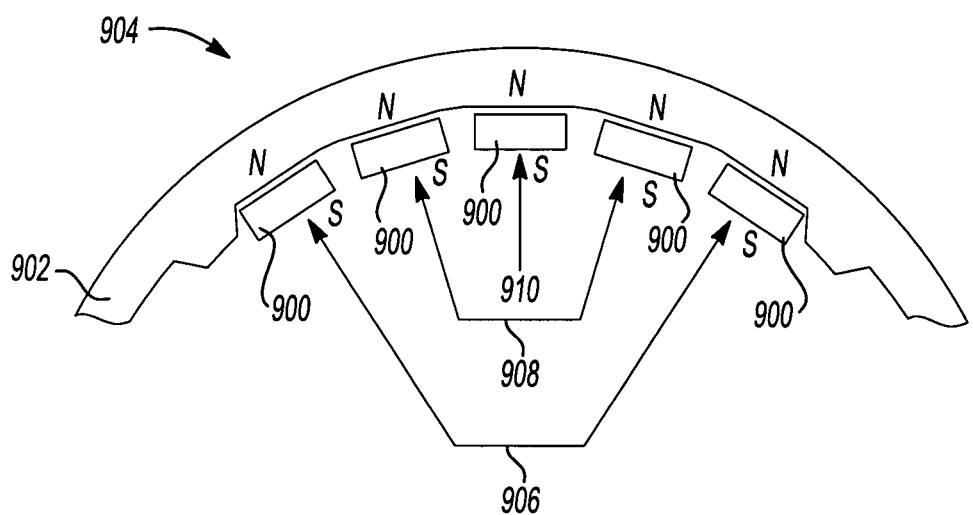
FIG. 9 is a schematic showing a sequence of insertion of magnets into a stator housing in accordance with an aspect of the present disclosure.

In an aspect of the present disclosure, and with reference to FIG. 9, magnets 900 are assembled into stator housing 902 of stator assembly 904 outermost to innermost. In FIG. 9 where there are five magnets, outermost magnets 900 (designated with reference number 906) are first inserted into stator housing 902, then the next outermost magnets 900 (designated with reference number 908) then the center magnet 900 (designated with the reference number 910). While magnets 900 are shown as flat in FIG. 9, it should be understood that this assembly order can be used with arcuate magnets.

Figure 10:
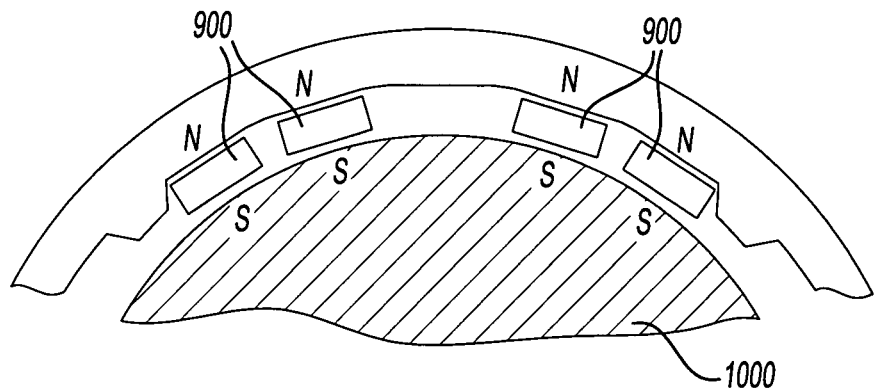
FIG. 10 is a schematic view of fixturing of magnets during the insertion sequence of FIG. 9.

In carrying out the outermost to innermost assembly of magnets 900, the outer magnets 906, 908 which have already been inserted in stator housing 902 can advantageously be held in place with a non-magnetic fixture (FIG. 10) when center magnets 910 are inserted in stator housing 902. In an aspect, a guiding fixture is used when inserting center magnets 910 in stator housing 902 to keep center magnets 910 from jumping on top of the already positioned outer magnets 906, 908 (which is the magnetically stable position).

Alternatively, magnets 900 could be assembled into stator housing 902 innermost to outermost.

In an aspect of the present disclosure, it may be optimal to have a magnetic circuit with edges of adjacent flat magnets touching at their mating edges, or it may be optimal to have a slight space between the flat magnets depending on the optimization of the magnet circuit.

Figure 14:
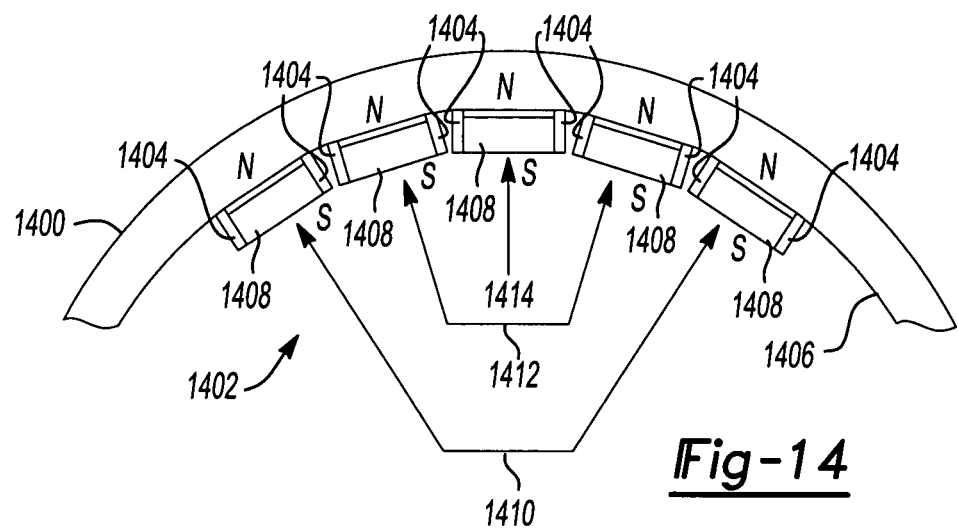
FIG. 14 is a side view of a section of a stator housing having magnets disposed between anchors that extend radially inwardly from an inner surface of the stator housing in accordance with an aspect of the present disclosure.

In accordance with a variation of the assembly sequence described above where the magnets are inserted into the stator housing from outermost to inner most, magnetized magnets having the same magnetic polarity orientation are assembled in a stator housing or, alternatively, the flux ring, having protruding anchors. (A stator housing/flux ring having anchors is described in U.S. Pat. Nos. 6,522,042, 6,983,529 and in U.S. Pat. No. 7,088,024). With reference to FIG. 14, which shows a section of a stator housing 1400 having a pole 1402, anchors 1404 extend radially inwardly from inner surface 1406 of stator housing 1400. Each flat magnet 1408 is illustratively disposed between a pair of anchors 1404. Anchors 1404 restrain the outermost flat permanent magnets 1408 (designated with reference number 1410), which are first inserted into stator housing 1400 from being angularly displaced by the flat permanent magnets 1408 subsequently inserted into stator housing 1400. In this regard, the second set of flat permanent magnets inserted into stator housing 1400 is designated with reference number 1412 and the center flat permanent magnet 1408, which is last inserted into stator housing 1400, is designated with reference number 1414.

In an aspect, the clearance between each magnet 1408 and its respective anchors 1404 is minimized so that the radially inner edges of adjacent magnets 1408 essentially touch each other. That is, these edges either touch each other, or have a small space between them due to manufacturing tolerances. The angular retention of the magnets 1408 by their respective anchors 1404 facilitate this configuration of adjacent magnets 1408 with their inner radially edges essentially touching each other.

Figure 15:
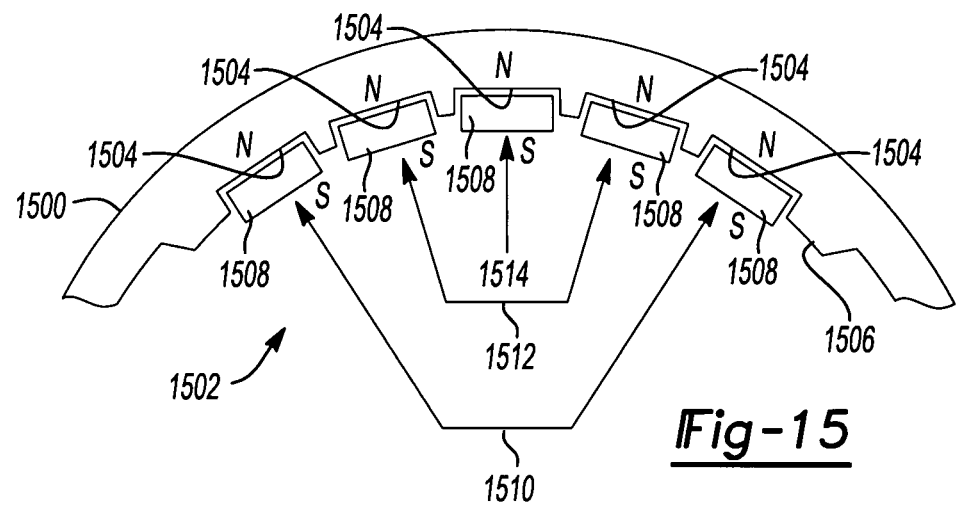
FIG. 15 is a side view of a section of a stator housing having magnets disposed in recesses in an inner surface of the stator housing in accordance with an aspect of the present disclosure.

In accordance with a variation of the assembly sequence described above where the magnets are inserted into the stator housing from outermost to inner most, magnetized magnets having the same magnetic polarity orientation are assembled in a stator housing or, alternatively, the flux ring, having recesses in which the magnets are disposed. (Such stator housings/flux rings having recesses are described in U.S. Pat. No. 6,522,042) With reference to FIG. 15, which shows a section of a stator housing 1500 having a pole 1502, an inner surface 1506 of stator housing 1500 has recesses therein in which flat permanent magnets 1508 are received. Each flat permanent magnet 1508 is illustratively received in a recess 1504. Recesses 1504 provide angular retention of the flat permanent magnets 1508, both preventing the outermost flat permanent magnets 1508 (designated with reference number 1510) from being angularly displaced when the subsequent flat permanent magnets 1508 are inserted into the stator housing 1500 and facilitating the configuration of the flat permanent magnets 1508 of each pole where adjacent flat permanent magnets 1508 have their radially inner edges essentially touching each other. In this regard, the second set of flat permanent magnets inserted into stator housing 1500 is designated with reference number 1512 and the center flat permanent magnet 1508, which is last inserted into stator housing 1500, is designated with reference number 1514.

Figure 16:
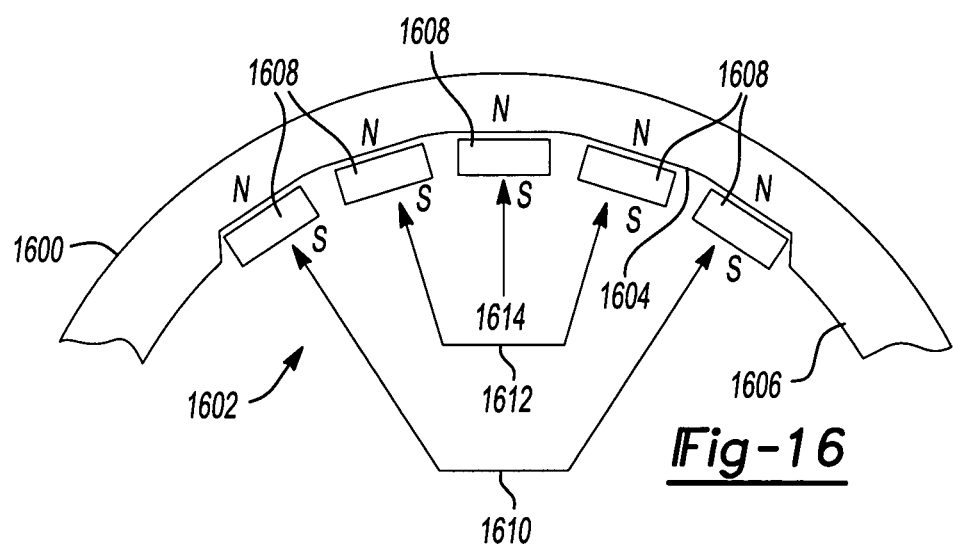
FIG. 16 is a side view of a section of a stator housing in which all the magnets of a pole are pole disposed in the same recess in an inner surface of the stator housing in accordance with an aspect of the present disclosure.

Alternatively, the recess is for an entire pole 1602 (FIG. 16) (or pole segment in cases where the pole has multiple segments), as shown by recess 1604 in inner surface 1606 of stator housing 1600, as shown in FIG. 16. In this case, the outermost flat permanent magnets 1608 (designated with reference number 1610) are restrained from being angularly displaced by the flat permanent magnets 1608 subsequently inserted into stator housing 1600. In this regard, the second set of flat permanent magnets 1608 inserted into stator housing 1600 is designated with reference number 1612 and the center flat permanent magnet 1508, which is last inserted into stator housing 1600, is designated with reference number 1614.

Figure 11:
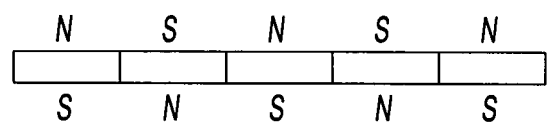
FIG. 11 is a schematic view of a pre-assembly of magnets in an alternating magnetic polarity configuration in accordance with an aspect of the present disclosure.
Figure 12:
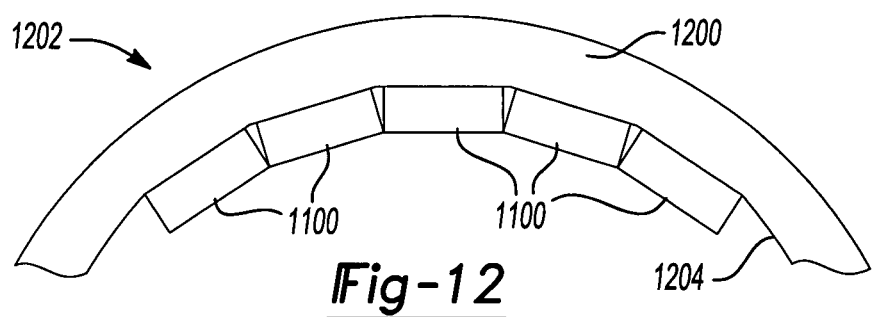
FIG. 12 is a side view of a section of a stator housing having the pre-assembly of magnets of FIG. 11 inserted therein.

In an aspect of the present disclosure, the magnets are pre-magnetized (partially or completely) before assembling them into the stator housing. In an aspect of the present disclosure, and with reference to FIG. 11, the magnets 1100 are pre-assembled with alternating magnetic polarities: N-S-N-S. In this regard, the poles of the magnets 1100 are radially oriented where one of the North and South poles of each magnet 1100 is on a radial outer edge of the magnet 1100 and the other is on a radial inner edge of the magnet 1100. By alternating polarities, the magnets 1100 that form each pole of the motor attract each other at their adjacent edges. Once the magnets 1100 are pre-assembled, they are then inserted into stator housing 1200 (FIG. 12) to form stator assembly 1202 (only a portion of which is shown in FIG. 12). The magnets are then re-magnetized to a final, desired magnetic polarity configuration. Typically, the final, desired magnetic polarity configuration would have each magnet of a pole with the same magnetic polarity as the other magnets of the pole.

In an aspect, since such an alternating polarity pattern is not the required final magnetic configuration, the magnets 1100 are only partially magnetized during the pre-assembly stage. This allows for easier re-magnetization in the final desired magnetic polarity configuration.

In an aspect, the stator assembly having the magnets 1100 pre-assembled with alternating magnetic polarities is preheated to an appropriate elevated temperature to more easily fully re-magnetize the magnets 1100 in the final, correct polarity magnetic configuration.

Before the preassembled magnets 1100 are inserted into stator housing 1200, the edges of the adjacent magnets are touching. Upon insertion into an a stator housing having a generally arcuate inner surface, such as stator housing 1200, the edges of magnets 1100 become separated and conform to the more magnetically stable condition of the generally arcuate shape of the inner surface 1204 of stator housing 1200. At this point, the edges of adjacent magnets 1100 remain touching only by line contact at their radially inner edges. If it were then necessary to separate the magnets in the final magnetic configuration, it would be difficult in that the magnetic attraction between the adjacent magnets would need to be overcome. As a practical matter, this would likely require separations or spacers, which adds parts and increases cost. It should be understood that the generally arcuate shape of inner surface 1204 of stator housing 1200 can include flat sections on which the magnets 1100 are placed.

Figure 13:
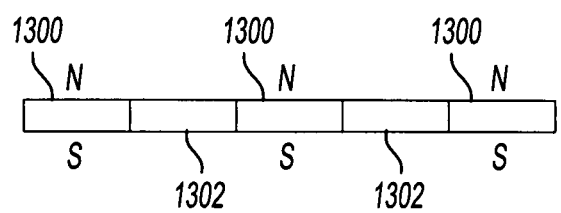
FIG. 13 is a schematic view of a pre-assembly of magnets with unmagnetized magnets disposed between magnetized magnets in accordance with an aspect of the present disclosure.

In an aspect, alternatively to pre-assembling the magnets in an alternating magnetic polarity arrangement, the magnets are pre-assembled with alternating magnetized (at least partially) magnets and unmagnetized magnets. (As used herein, an "unmagnetized" magnet is a block of magnetic material formed to the desired shape but not magnetized and a "magnetized" magnet is a block of magnetic material formed to the desired shape and magnetized.) In this aspect, as shown in FIG. 13, magnetized magnets 1300 are oriented with the same polarity orientation with unmagnetized magnets 1302 interspersed between magnetized magnets 1300. The unmagnetized magnets 1302 bridge and hold together the magnetized magnets 1300. The aforementioned assembly considerations also apply to this approach, but it is easier to fully magnetize the pre-assembly as there is no need to reverse the polarity of any of the magnets. That is, the magnetized magnets 1300 are pre-assembled in the final polarity orientation and when magnetizing the magnets to the final desired polarity configuration, there is no need to reverse the polarity of the unmagnetized magnets 1302.

Where it is desired to have a slight space between adjacent magnets of a pole (or a pole segment where the pole has multiple segments each having multiple magnets), then in an aspect unmagnetized magnets are inserted into the stator housing and then magnetized after they are affixed the magnets to the stator housing. Alternatively, the magnets are magnetized and then inserted into the stator housing (and affixed thereto) with all the magnets having the same magnetic polarity orientation, which is the same magnetic polarity orientation as the final correct polarity orientation. No further magnetization of the magnets would thus be needed after they are inserted into the stator housing. Since the adjacent magnets have the same polarity orientation, they repel each other causing them to be spaced apart from each other within the boundaries of the physical restraints on the outer most magnets.

In an aspect, the magnets can be secured in the stator housing by glue, overmolding, double sided adhesives, or other affixation techniques, with or without being magnetized before they are inserted in the stator housing. Where the magnets are unmagnetized magnets, fixturing would illustratively be used to properly position the magnets in the stator housing.

It should be understood that while many of the above aspects were described with reference to a two pole motor (i.e., one North and one South pole), these aspects are also applicable to motors having more than two poles.

Figure 17:
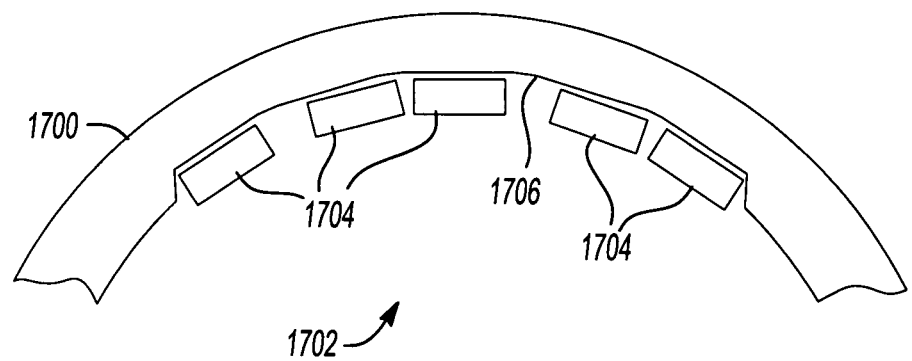
FIG. 17 is a side view of a section of a stator housing in which the magnets of a pole are unevenly disposed about the pole in accordance with an aspect of the present disclosure.

In another aspect, with reference to FIG. 17 which shows a section of a stator housing 1700 having a pole 1702, permanent magnets 1704 are affixed to an inner surface 1706 of stator housing 1700. Permanent magnets 1704 are unevenly spaced about pole 1702 to further optimize motor performance. Permanent magnets 1704 can be either flat permanent magnets or arcuate permanent magnets.

Figure 18:
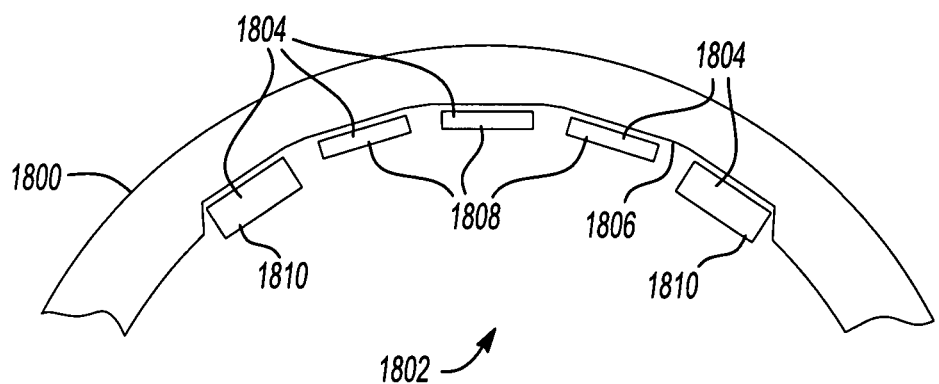
FIG. 18 is a side view of a section of a stator housing in which at least one magnet of a pole is thinner than other magnets of the pole in accordance with an aspect of the present disclosure.

In another aspect, with reference to FIG. 18 which shows a section of a stator housing 1800 having a pole 1802, permanent magnets 1804 are affixed to an inner surface 1806 of stator housing 1800. The three inner most permanent magnets 1804, designated with reference number 1808, are thinner than the outermost permanent magnets 1804, designated with reference number 1810. Permanent magnets 1804 can either be flat permanent magnets or arcuate permanent magnets. In an aspect, the inner most permanent magnets are at least ten percent thinner than the outermost permanent magnets.

Alternatively, or in addition, outermost permanent magnets 1808 are made of a magnetic material that is more resistant to demagnetization than inner magnets 1808.

What is claimed is:

1. A method of assembling a stator assembly having a stator housing, comprising:
   pre-assembling magnetized magnets and unmagnetized magnets so that each unmagnetized magnet is disposed between two of the magnetized magnets for each pole of the stator housing;
   inserting the pre-assembled magnets into the stator housing;
   affixing the magnets to an inner surface of the stator housing; and
   magnetizing the unmagnetized magnets.

2. A permanent magnet electric motor, comprising:
   a rotor and a stator; and
   the stator having a plurality of poles, each pole including a plurality of permanent magnets affixed to an inner surface of the stator housing wherein the permanent magnets of each pole are unevenly and asymmetrically spaced over the pole.

* * * * *